United States Patent [19]

Pace

[11] 4,281,763
[45] Aug. 4, 1981

[54] TWO-PIECE HARDSHELL, SOLUBLE AND DIGESTIBLE LIQUID CONTAINING GELATIN CAPSULE

[76] Inventor: Joseph A. Pace, 3645 Villanova Ct., Bethlehem, Pa. 18017

[21] Appl. No.: 89,772

[22] Filed: Oct. 31, 1979

[51] Int. Cl.³ .............................................. B65D 83/04
[52] U.S. Cl. ....................................... 206/530; 220/8; 220/359
[58] Field of Search ...................... 220/8, 359; 424/21; 206/528, 530, 540

[56] References Cited

U.S. PATENT DOCUMENTS

| | | | |
|---|---|---|---|
| 525,846 | 9/1894 | Hobbs | 206/530 |
| 2,102,885 | 12/1937 | Carroll | 220/8 |
| 2,340,037 | 1/1944 | Zipper | 206/530 |
| 3,258,115 | 6/1966 | Kath | 206/530 |
| 4,196,565 | 4/1980 | Bodenmann et al. | |

*Primary Examiner*—Joseph Man-Fu Moy
*Attorney, Agent, or Firm*—Richard C. Woodbridge

[57] ABSTRACT

An elongated, two-piece, hardshell, digestible gelatin capsule, to be taken orally, comprising a C-shaped body member into which may be inserted a liquid, and a digestible hard-shell gelatin cap member formed with a stepped free marginal edge portion complementary to the body member, telescopically registrable with the free upper end of the body and welded thereto in overlapping hermetically sealing, closing relation.

2 Claims, 5 Drawing Figures

TWO-PIECE HARDSHELL, SOLUBLE AND DIGESTIBLE LIQUID CONTAINING GELATIN CAPSULE

BACKGROUND OF THE INVENTION

Liquid leach and leakage problems have plagued procedures intended for filling and sealing of liquid-containing capsules intended for oral use. Complicated filling and sealing procedures, tried in an effort to remedy the difficulties, have failed to enable production, at low cost, of consistently reliable, leak proof, practical quantity production of such products.

OBJECTS AND SUMMARY OF THE INVENTION

The invention overcomes the foregoing and other objections to procedures in the prior art, by providing a hermetically sealed, two-piece, hardshell, liquid filled, elongated gelatin capsule, readily soluble internally of the body when swallowed, and capable of consistently pratical and reliable quantity production, at low cost, of such capsules. The capsule of the invention comprises a gelatin hardshell cap member formed with a stepped, contoured, marginal portion for closing registration 360° with the open end of a hardshell gelatin capsule body, an elongated apron portion depending from the cap portion and telescopically contiguously overlapping the upper end of the body member.

Pursuant to the invention, ultrasonic means are applied to said telescopically overlapping portions of the cap and body member on alignment registration thereof, achieving a 360° hermetic sealing of the capsule, and further achieving a closed gelatin capsule which may be readily swallowed, rapidly dissolved and digested in the body, with prompt release of the contents of the capsule into the bloodstream, and which may be manufactured in quantities at low cost, in consistently reliable, practical form.

The term "gelatin" is used herein to designate the material of which the capsule of the invention is made, comprises a non-synthetic, substantially tasteless and odorless dried protein, readily soluble, digestible and compatible, when taken orally, and dissolving readily when swallowed. Formed by boiling the bones, shins, and tendons of animals.

DESCRIPTION OF THE DRAWINGS

In the drawings, illustrating preferred embodiments of the invention, and wherein similar reference characters, indicate like parts.

DESCRIPTION OF PREFERRED EMBODIMENTS

Figure 1:
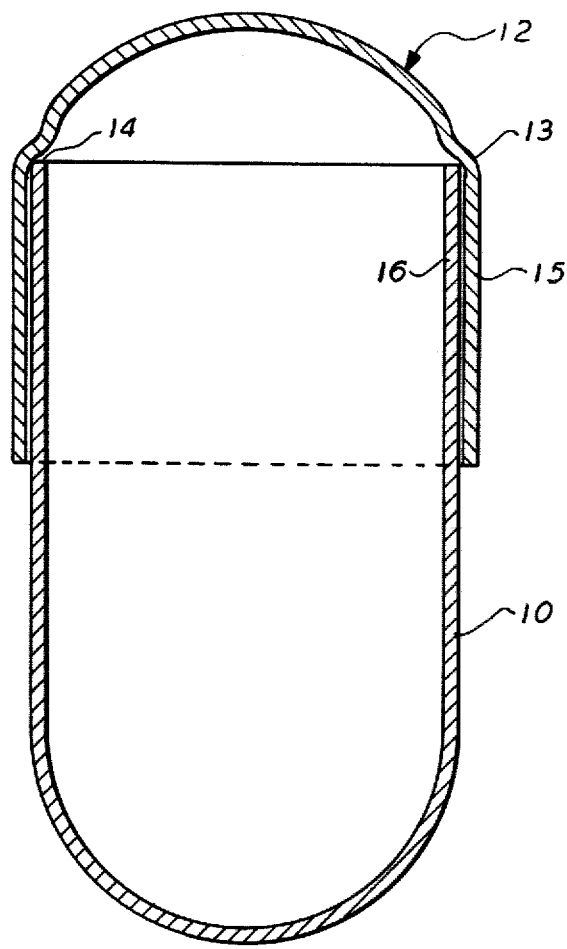
FIG. 1 is a vertical, sectional, assembled view of a two-part digestible gelatin capsule, comprising a hard shell gelatin cap member and a hardshell gelatin body member, shown assembled preparatory to being inserted into a holding fixture.

In preferred embodiments of the invention, as shown in the drawings, the hard-shelled soluble and digestible gelatin capsule comprises a U-shaped body member 10 wherein may be positioned liquids or pharmaceutical products, and a cap member 11 having a dome end portion 12 and having an outwardly stepped circumferential rim portion 13 formed to telescopically register, on assembly with the free upper end portion 14 of the body member. The cap member is provided with a depending skirt portion 15 below the stepped rim portion 13; on assembly of the parts (FIG. 1) the stepped rim portion 13 of the cap overlies the free upper end 14 of the body member 10 in closing relation, the depending skirt portion 15 of the cap member telescopically registering with and contiguously overlying the upper portion 16 of the body member.

Figure 2:
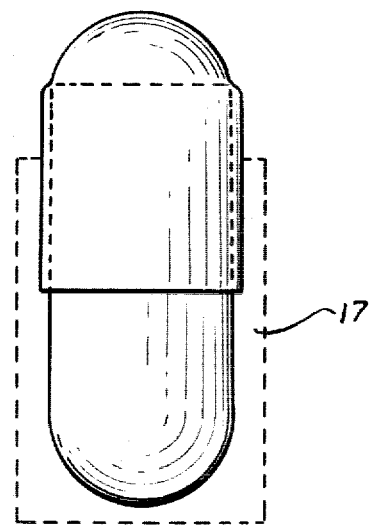
FIG. 2 is a side elevational view of the assembled capsule positioned in and extending out of a fixture shown in dotted lines.
Figure 3:
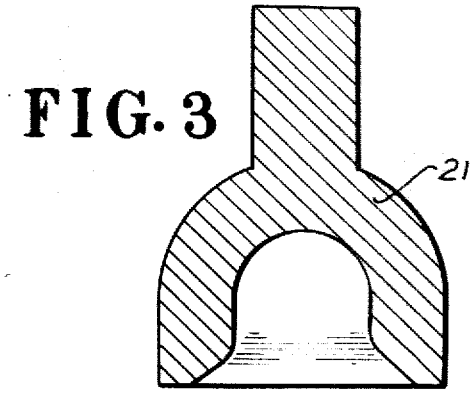
FIG. 3 is a vertical sectional view of an ultrasonic horn fixture which may be used in carrying out the invention.

The cap member 11 and body member 10 of the capsule are shown in clsoed relation in FIG. 1 and positioned in a fixture 17 in FIG. 2, with the stepped rim cap portion 13 and adjacent depending apron portion thereof disposed outwardly of the fixture 17.

Figure 4:
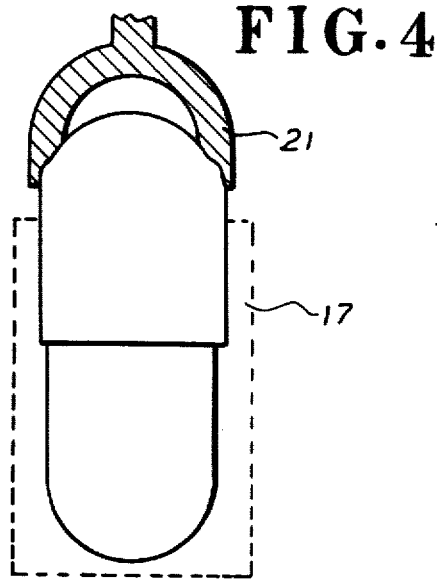
FIG. 4 is a side elevational view of the assembled capsule in the fixture (shown in dotted lines), the ultrasonic horn being applied to the capsule to weld the cap and body member.

An ultrasonic horn 21 is positioned over the assembled parts (FIG. 4) in overlying relation to the stepped rim portion 13 of the cap and adjacent apron portion 15 telescopically registered with the upper portion 16 of the body member within the horn.

Figure 5:
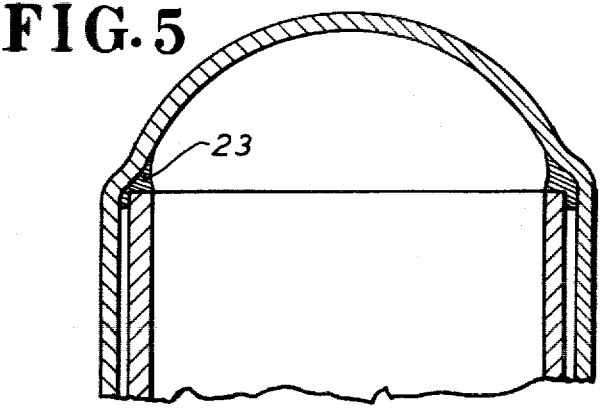
FIG. 5 is a medial vertical sectional view of the upper portions of the capsule cap and body member so welded together and thus ultrasonically sealed 360°.

Upon being energized by any well-known ultrasonic means, the horn will ultrasonically hermetically for 360° thereby weld, as noted at 23 (FIG. 5) and unify the outwardly stepped portion 13 of the cap member to the upper end 14 of the body member.

The fixture 17 may be a turntable or other practical form of a multi-unit fixture wherein a large number of capsules may be simultaneously so formed and sealed.

The preferred embodiment of the invention has been set forth above. It is to be understood, however, that variations may be made in such preferred embodiment, which variations may nevertheless be within the scope and spirit of the invention. The invention is therefore to be broadly construed, within the scope and spirit of the appended claims.

I claim:

1. A two-piece hardshell, soluble and digestible liquid containing gelatine capsule comprising:
   a U-shaped body member having a closed lower end and an open free end terminating in an upper edge;
   a cap member for receiving the upper end of said U-shaped body member, said cap member including a continuous interior rim formed in said cap member for abuttingly engaging said upper edge of said U-shaped body member when said capsule is in the assembled state, said cap member further including an apron portion depending from said interior rim; and,
   a substantially continuous and substantially liquid impervious interior ultrasonic weld means for attaching said upper edge of said U-shaped body member to said interior rim thereby forming an interior ultrasonic weld which extends continuously 360° around said upper edge of said U-shaped body member.

2. The apparatus of claim 1 wherein said cap member is shorter in length than said U-shaped body member.

* * * * *